(12) United States Patent
Tokuda et al.

(10) Patent No.: US 11,366,032 B2
(45) Date of Patent: Jun. 21, 2022

(54) SENSOR DEVICE WITH MULTIPLE SIMULTANEOUS PRESSURE MEASUREMENTS

(71) Applicant: AZBIL CORPORATION, Tokyo (JP)

(72) Inventors: Tomohisa Tokuda, Chiyoda-ku (JP);
Masayuki Yoneda, Chiyoda-ku (JP);
Hirofumi Tojo, Chiyoda-ku (JP);
Ayumi Tsushima, Chiyoda-ku (JP);
Nozomi Kida, Chiyoda-ku (JP)

(73) Assignee: AZBIL CORPORATION, Tokyo (JP)

( * ) Notice: Subject to any disclaimer, the term of this patent is extended or adjusted under 35 U.S.C. 154(b) by 0 days.

(21) Appl. No.: 17/064,639

(22) Filed: Oct. 7, 2020

(65) Prior Publication Data
US 2021/0108981 A1 Apr. 15, 2021

(30) Foreign Application Priority Data
Oct. 9, 2019 (JP) .............................. JP2019-185770

(51) Int. Cl.
*G01L 15/00* (2006.01)
*G01L 19/00* (2006.01)
*G01L 13/02* (2006.01)

(52) U.S. Cl.
CPC ............ *G01L 15/00* (2013.01); *G01L 13/026* (2013.01); *G01L 19/0038* (2013.01); *G01L 19/0046* (2013.01)

(58) Field of Classification Search
None
See application file for complete search history.

(56) References Cited

U.S. PATENT DOCUMENTS 9,709,451 B2* 7/2017 Kaelberer ............. B81B 3/0037
2015/0047435 A1* 2/2015 Ostrick ................. B81B 3/0021
73/716

FOREIGN PATENT DOCUMENTS

JP 2015-512046 4/2015

* cited by examiner

*Primary Examiner* — Lisa M Caputo
*Assistant Examiner* — Nigel H Plumb
(74) *Attorney, Agent, or Firm* — Oblon, McClelland, Maier & Neustadt, L.L.P.

(57) ABSTRACT

A sensor element includes a sensor chip and a diaphragm base joined to a surface of the sensor chip. The sensor chip includes a first diaphragm for measuring differential pressure between a first pressure and a second pressure and a second diaphragm for measuring absolute pressure or gage pressure of the second pressure. The diaphragm base includes a third diaphragm to directly receive a fluid that is a measurement target and has the first pressure, and a fourth diaphragm to directly receive a fluid that is a measurement target and having the second pressure. The sensor element has a liquid amount adjustment chamber to make an amount of a first pressure transmission medium filled in a first pressure introduction path and an amount of a second pressure transmission medium filled in a second pressure introduction path to be equal to each other.

3 Claims, 6 Drawing Sheets

SENSOR DEVICE WITH MULTIPLE SIMULTANEOUS PRESSURE MEASUREMENTS

CROSS-REFERENCE TO RELATED APPLICATIONS

The present application is based on and claims priority to Japanese Application No. 2019-185770, filed Oct. 9, 2019, the entire contents of which are incorporated herein by reference.

BACKGROUND

1. Field of the Disclosure

The present disclosure relates to a sensor element.

2. Description of the Related Art

As a pressure sensor that detects differential pressure or pressure, there has been a known semiconductor piezoresistive pressure sensor in which piezoresistors are formed in a semiconductor diaphragm that serves as a pressure sensitive unit (see Japanese Unexamined Patent Application Publication (Translation of PCT Application) No. 2015-512046).

SUMMARY

The pressure sensor disclosed in Japanese Unexamined Patent Application Publication (Translation of PCT Application) No. 2015-512046 aims at measuring only differential pressure or absolute pressure. There has not been a known structure with which a plurality types of pressure such as differential pressure and absolute pressure are simultaneously measured.

The present disclosure has been made to address the above-described problem, and an object of the present disclosure is to provide a sensor element with which a plurality types of pressure can be simultaneously measured.

A sensor element according to a present disclosure includes a sensor chip and a diaphragm base. The diaphragm base is joined to one surface of the sensor chip. The sensor chip includes a first diaphragm and a second diaphragm. The first diaphragm is for measuring differential pressure between first pressure and second pressure. The second diaphragm is for measuring absolute pressure or gage pressure of the second pressure. The sensor chip has a first pressure introduction path and a second pressure introduction path. The first pressure is to be transmitted to the first diaphragm through the first pressure introduction path. The second pressure is to be transmitted to the first diaphragm and the second diaphragm through the second pressure introduction path. The diaphragm base includes a third diaphragm and a fourth diaphragm. The third diaphragm is configured to directly receive a fluid that is a measurement target having the first pressure. The fourth diaphragm is configured to directly receive a fluid that is a measurement target having the second pressure. The diaphragm base has a third pressure introduction path and a fourth pressure introduction path. The third pressure introduction path communicates with the first pressure introduction path so as to allow the first pressure received by the third diaphragm to be transmitted to the first pressure introduction path and the first diaphragm through the third pressure introduction path. The fourth pressure introduction path communicates with the second pressure introduction path so as to allow the second pressure received by the fourth diaphragm to be transmitted to the second pressure introduction path and the second diaphragm through the fourth pressure introduction path. A first pressure transmission medium that is able to transmit the first pressure to the first diaphragm is filled from the first pressure introduction path to the third pressure introduction path. The second pressure transmission medium that is able to transmit the second pressure to the first diaphragm and the second diaphragm is filled from the second pressure introduction path to the fourth pressure introduction path. The sensor element has an adjustment structure that is provided at partway along a pressure introduction path out of the first pressure introduction path to the third pressure introduction path and that is configured to make an amount of the first pressure transmission medium and an amount of the second pressure transmission medium to be substantially equal to each other.

In a structural example of the sensor element according to the present disclosure, the adjustment structure is a liquid amount adjustment chamber provided partway along the first pressure introduction path so as to make the amount of the first pressure transmission medium and the amount of the second pressure transmission medium to be substantially equal to each other.

In a structural example of the sensor element according to the present disclosure, the adjustment structure is a liquid amount adjustment chamber provided partway along the third pressure introduction path so as to make the amount of the first pressure transmission medium and the amount of the second pressure transmission medium to be substantially equal to each other.

According to the present disclosure, a plurality of types of pressure can be simultaneously measured.

DETAILED DESCRIPTION

First Embodiment

Figure 1:
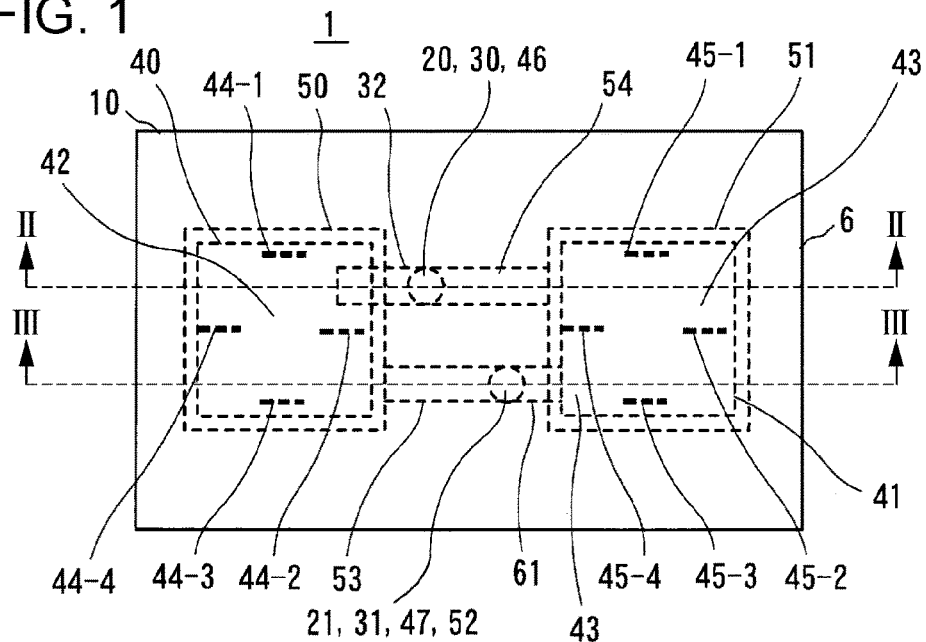
FIG. 1 is a plan view of a sensor element according to a first embodiment of the present disclosure.
Figure 2:
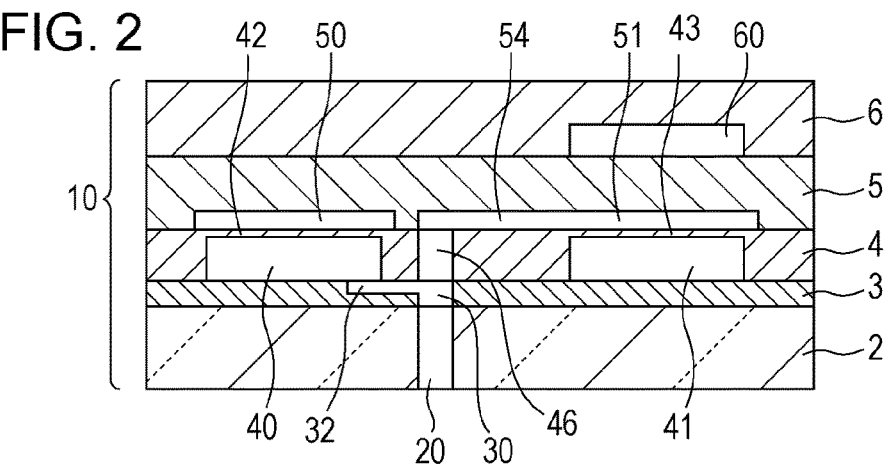
FIG. 2 is a sectional view of the sensor element according to the first embodiment of the present disclosure.
Figure 3:
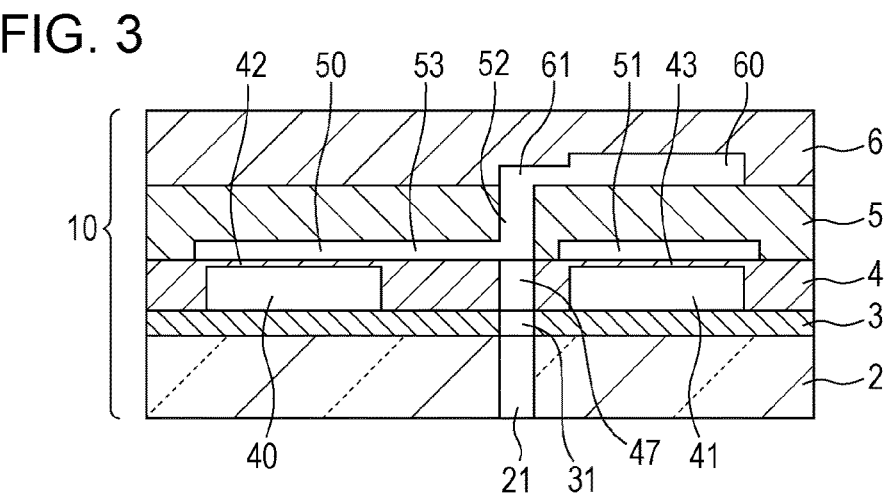
FIG. 3 is a sectional view of the sensor element according to the first embodiment of the present disclosure.

Embodiments of the present disclosure will be described below with reference to the drawings. FIG. 1 is a plan view of a sensor element according to a first embodiment of the present disclosure. FIG. 2 is a sectional view taken along line II-II of FIG. 1. FIG. 3 is a sectional view taken along line III-III of FIG. 1.

A sensor element 1 includes a flat plate-shaped sensor chip 10. The sensor chip 10 includes a base 2, a channel member 3, a pressure sensitive member 4, a lid member 5, and a liquid amount adjustment member 6. The base 2 having a flat plate shape is formed of glass. The channel member 3 having a flat plate shape is joined to the base 2 and formed of silicon. The pressure sensitive member 4 having a flat plate shape is joined to the channel member 3 and formed of silicon. The lid member 5 having a flat plate shape is joined to the pressure sensitive member 4 and formed of silicon. The liquid amount adjustment member 6 having a flat plate shape is joined to the lid member 5 and formed of silicon.

The base 2 has two through holes 20, 21 that serve as pressure introduction paths penetrating through the base 2 from a rear surface to a front surface.

The channel member 3 has through holes 30, 31 that serve as pressure introduction paths penetrating through the channel member 3 from a rear surface to a front surface. The through holes 30, 31 are disposed at positions where the through holes 30, 31 respectively communicate with the through holes 20, 21 when the base 2 and the channel member 3 are joined to each other. A groove 32 is formed in the front surface of the channel member 3 facing the pressure sensitive member 4. The groove 32 serves as a pressure introduction path that communicates with the through hole 30 at one end, and, when the channel member 3 and the pressure sensitive member 4 are joined to each other, communicates with a depression 40 at the other end, which will be described later.

Two square depressions 40, 41 (pressure introduction chambers) are formed in a rear surface of the pressure sensitive member 4 facing the channel member 3. The depressions 40, 41 are formed by removing the rear surface side of the pressure sensitive member 4 such that the front surface side of the pressure sensitive member 4 remains. Portions of the pressure sensitive member 4 remaining on the front surface sides of regions where the depressions 40, 41 are formed serve as diaphragms 42, 43.

Strain gages 44-1 to 44-4, 45-1 to 45-4 are formed, by using an impurity diffusion technique or an ion implantation technique, at peripheral portions of the diaphragms 42, 43 formed on the front surface sides of the regions of the depressions 40, 41 out of the front surface of the pressure sensitive member 4 facing the lid member 5. The strain gages 44-1 to 44-4, 45-1 to 45-4 function as piezoresistive elements. The strain gages 44-1 to 44-4 are respectively formed near midpoints of four sides of the diaphragm 42 (first diaphragm) having a square shape in plan view. Likewise, the strain gages 45-1 to 45-4 are respectively formed near midpoints of four sides of the diaphragm 43 (second diaphragm) having a square shape in plan view.

The pressure sensitive member 4 has through holes 46, 47 that serve as pressure introduction paths penetrating through the pressure sensitive member 4 from the rear surface to the front surface. The through holes 46, 47 are disposed at positions where the through holes 46, 47 respectively communicate with the through holes 30, 31 when the channel member 3 and the pressure sensitive member 4 are joined to each other.

Two square depressions 50, 51 (pressure introduction chambers) are formed, in a rear surface of the lid member 5 facing the pressure sensitive member 4, at positions where the lid member 5 covers the diaphragms 42, 43 when the pressure sensitive member 4 and the lid member 5 are joined to each other. The depressions 50, 51 are formed by removing the rear surface side of the lid member 5 such that the front surface side of the lid member 5 remains. The lid member 5 has a through hole 52 that serves as a pressure introduction path penetrating through the lid member 5 from the rear surface to the front surface. The through hole 52 are disposed at a position where the through hole 52 communicates with the through hole 47 when the pressure sensitive member 4 and the lid member 5 are joined to each other. A groove 53 is formed in the rear surface of the lid member 5. The groove 53 serves as a pressure introduction path that communicates with the through hole 52 at one end and communicates with the depression 50 at the other end. Also, a groove 54 is formed in the rear surface of the lid member 5. The groove 54 serves as a pressure introduction path that communicates with the through hole 46 at one end when the pressure sensitive member 4 and the lid member 5 are joined to each other and communicates with the depression 51 at the other end.

A depression 60 (liquid amount adjustment chamber) is formed in a rear surface of the liquid amount adjustment member 6 facing the lid member 5. The depression 60 is formed by removing the rear surface side of the liquid amount adjustment member 6 such that the front surface side of the liquid amount adjustment member 6 remains. Also, a groove 61 is formed in the rear surface of the liquid amount adjustment member 6. The groove 61 serves as a pressure introduction path that communicates with the through hole 52 at one end when the lid member 5 and the liquid amount adjustment member 6 are joined to each other and communicates with the depression 60 at the other end.

Of course, the through holes 20, 21, 30, 31, 46, 47, 52, the depressions 40, 41, 50, 51, 60, and the grooves 32, 53, 54, 61 can be easily formed by etching. Likewise, through holes, depressions, and grooves in embodiments below can be easily formed by etching.

The base 2 and the channel member 3 are joined to each other by direct bonding such that the through holes 20, 21 of the base 2 and the respective through holes 30, 31 of the channel member 3 communicate with each other.

The channel member 3 and the pressure sensitive member 4 are joined to each other by direct bonding such that the through holes 30, 31 of the channel member 3 and the respective through holes 46, 47 of the pressure sensitive member 4 communicate with each other and the groove 32 of the channel member 3 and the depression 40 of the pressure sensitive member 4 communicate with each other.

The pressure sensitive member 4 and the lid member 5 are joined to each other by direct bonding such that the depressions 50, 51 of the lid member 5 are disposed over the diaphragms 42, 43 of the pressure sensitive member 4, the through hole 46 of the pressure sensitive member 4 and the groove 54 of the lid member 5 communicate with each other, and the through hole 47 of the pressure sensitive member 4 and the through hole 52 of the lid member 5 communicate with each other. The lid member 5 and the liquid amount adjustment member 6 are joined to each other by direct bonding such that the through hole 52 of the lid member 5 and the groove 61 of the liquid amount adjustment member 6 communicate with each other.

A first oil (first pressure transmission medium) can reach an upper surface of the diaphragm 42 through the through holes 21, 31, 47, 52, the groove 53, and the depression 50. The first oil transmits first pressure applied thereto to the upper surface of the diaphragm 42. A second oil (second pressure transmission medium) can reach a lower surface of the diaphragm 42 through the through holes 20, 30, the groove 32, and the depression 40. The second oil transmits second pressure applied thereto to the lower surface of the diaphragm 42. The second oil can reach an upper surface of the diaphragm 43 through the through holes 20, 30, 46, the groove 54, and the depression 51. The second oil transmits the second pressure applied thereto to the upper surface of the diaphragm 43. The depression 41 (reference chamber) on the lower surface of the diaphragm 43 is in a vacuum state and hermetically sealed.

The through holes 21, 31, 47, 52, the groove 53, and the depression 50 define a first pressure introduction path through which the first pressure is transmitted to the diaphragm 42. The through holes 20, 30, 46, the groove 32, 54, and the depressions 40, 51 define a second pressure introduction path through which the second pressure is transmitted to the diaphragms 42, 43.

Although it is not illustrated in FIGS. 1 to 3, for example, the pressure sensitive member 4 is formed to have a greater size than that of the lid member 5 in planar shape and eight electrode pads respectively electrically connected to the strain gages 44-1 to 44-4, 45-1 to 45-4 are formed on the exposed surface of the pressure sensitive member 4 so as to allow the strain gages 44-1 to 44-4, 45-1 to 45-4 to be connected to external circuits. This method of connecting the strain gages to the external circuits is similarly applicable to the embodiments below.

The strain gages 44-1 to 44-4 together with an external circuit form a Wheatstone bridge circuit for differential pressure measurement. With the Wheatstone bridge circuit for differential pressure measurement, differential pressure between the first pressure applied to the upper surface of the diaphragm 42 and the second pressure applied to the lower surface of the diaphragm 42 can be measured.

The strain gages 45-1 to 45-4 together with the external circuit form a Wheatstone bridge circuit for absolute pressure measurement. With the Wheatstone bridge circuit for absolute pressure measurement, the absolute pressure of the second pressure applied to the upper surface of the diaphragm 43 can be measured.

Detailed description of the configuration of the Wheatstone bridge circuit, which is a well-known technique, is omitted.

In this way, the differential pressure and the absolute pressure can be simultaneously measured with high sensitivity according to the present embodiment. Furthermore, the depression 60 serving as the liquid amount adjustment chamber is provided in the liquid amount adjustment member 6 according to the present embodiment. Thus, the amount of the first oil filled in the through holes 21, 31, 47, 52, the grooves 53, 61, and the depressions 50, 60 and the amount of the second oil filled in the through holes 20, 30, 46, the grooves 32, 54, and the depressions 40, 51 can be made to be equal to each other.

Figure 4:
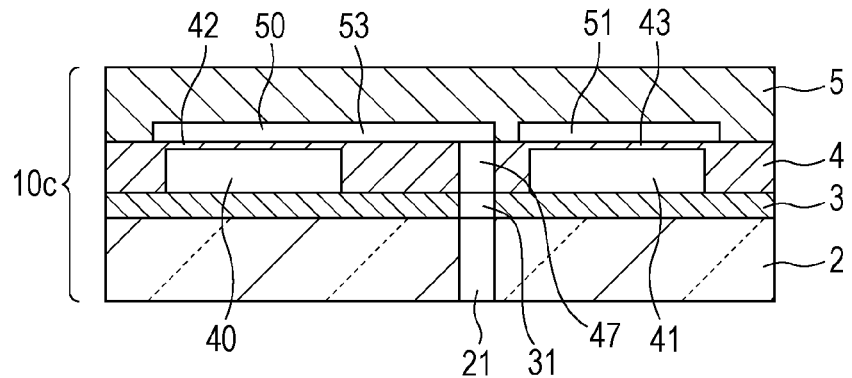
FIG. 4 is a sectional view illustrating an example of a sensor element without a liquid amount adjustment member.
Figure 5:
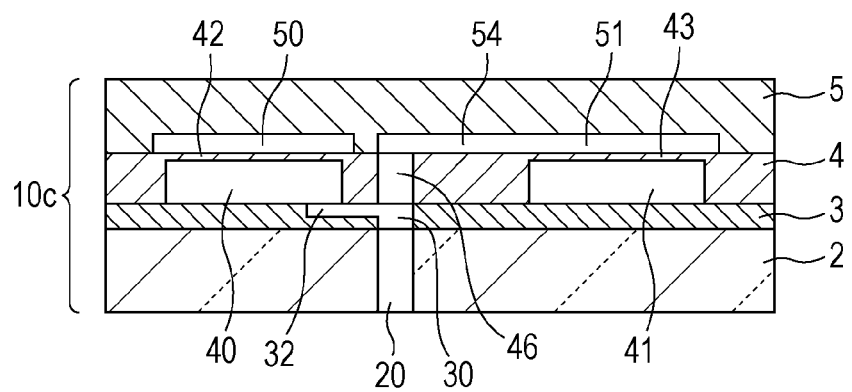
FIG. 5 is a sectional view illustrating the example of the sensor element without the liquid amount adjustment member.

Since the first oil is not introduced into the depression 41 on the lower surface of the diaphragm 43, the amount of the first oil becomes smaller than that of the second oil with a structure having no liquid amount adjustment member 6. FIGS. 4 and 5 illustrate an example of a sensor chip 10c without the liquid amount adjustment member 6. FIG. 4 is a sectional view of the sensor chip 10c taken along a line corresponding to line II-II of FIG. 1. FIG. 5 is a sectional view of the sensor chip 10c taken along a line corresponding to line III-III of FIG. 1. The difference in the amount of oil as described above causes a problem in that shifting of a zero point of the pressure caused by temperature increases due to the difference in the amount of oil. Influence of the above-described problem increases as the sizes of the diaphragms 42, 43 reduce (compliance reduces) due to size-reduction of a device.

In contrast, according to the present embodiment, the amount of the first oil and the amount of the second oil can be made to be equal to each other. This can reduce changes in characteristic (shifting of the zero point of the differential pressure) caused by expansion or contraction of oil due to changes in temperature. Thus, according to the present embodiment, the differential pressure and the absolute pressure can be simultaneously measured with high sensitivity, and the size of the sensor element can be reduced.

Figure 6:
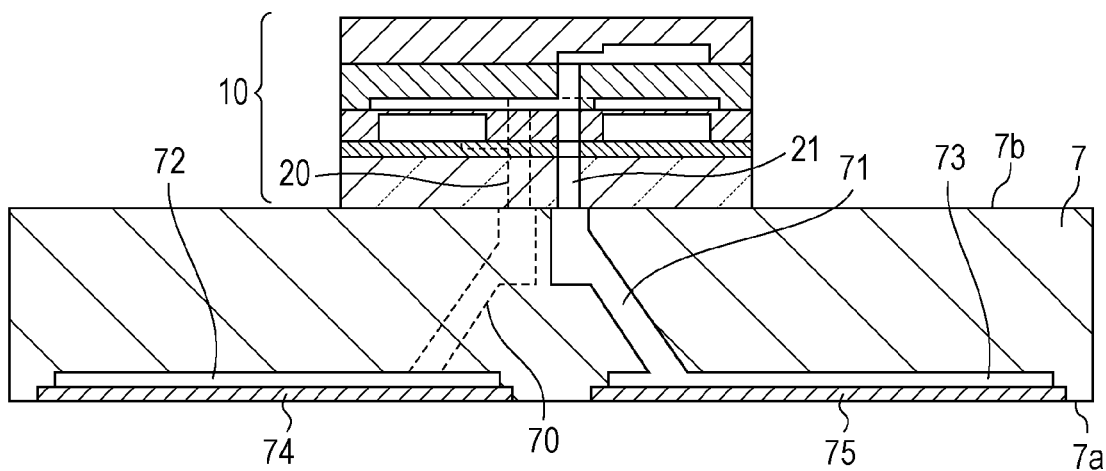
FIG. 6 is a sectional view of the sensor element in which a sensor chip is mounted on a diaphragm base according to the first embodiment of the present disclosure.

The sensor chip 10 is mounted on a diaphragm base. FIG. 6 illustrates a sectional view of the sensor element 1 when the sensor chip 10 is mounted on the diaphragm base.

A diaphragm base 7 is formed of a metal material for introducing pressure of fluids that are measurement targets to the sensor chip 10. Examples of the metal material may include a stainless steel (SUS). As illustrated in FIG. 6, the diaphragm base 7 has a main surface 7a and a main surface 7b on the opposite side to the main surface 7a. The diaphragm base 7 has through holes 70, 71 that penetrate through the diaphragm base 7 from the main surface 7a and the main surface 7b. Two depressions 72, 73 are formed in openings on the main surface 7a side of the through holes 70, 71. The depression 72 is covered with a barrier diaphragm 74 (fourth diaphragm) that directly receives a fluid that is a measurement target having the second pressure. Similarly, the depression 73 is covered with a barrier diaphragm 75 (third diaphragm) that directly receives a fluid that is a measurement target and having the first pressure. The barrier diaphragms 74, 75 are formed of, for example, stainless steel (SUS).

The sensor chip 10 and the diaphragm base 7 are joined to each other with an adhesive such that the through holes 20, 21 of the sensor chip 10 and the through holes 70, 71 of the diaphragm base 7 respectively communicate with each other.

The depression 73 and the through hole 71 of the diaphragm base 7 define a third pressure introduction path that communicates with the first pressure introduction path so as to allow the first pressure received by the diaphragm 75 to be transmitted to the first pressure introduction path and the diaphragm 42 through the third pressure introduction path. The depression 72 and the through hole 70 of the diaphragm base 7 define a fourth pressure introduction path that communicates with the second pressure introduction path so as to allow the second pressure received by the diaphragm 74 to be transmitted to the second pressure introduction path and the diaphragm 43 through the fourth pressure introduction path.

In the diaphragm base 7 according to the present embodiment, the amount of the first oil in the depression 73 and the through hole 71 and the amount of the second oil in the depression 72 and the through hole 70 are made to be equal to each other.

Second Embodiment

Figure 7:
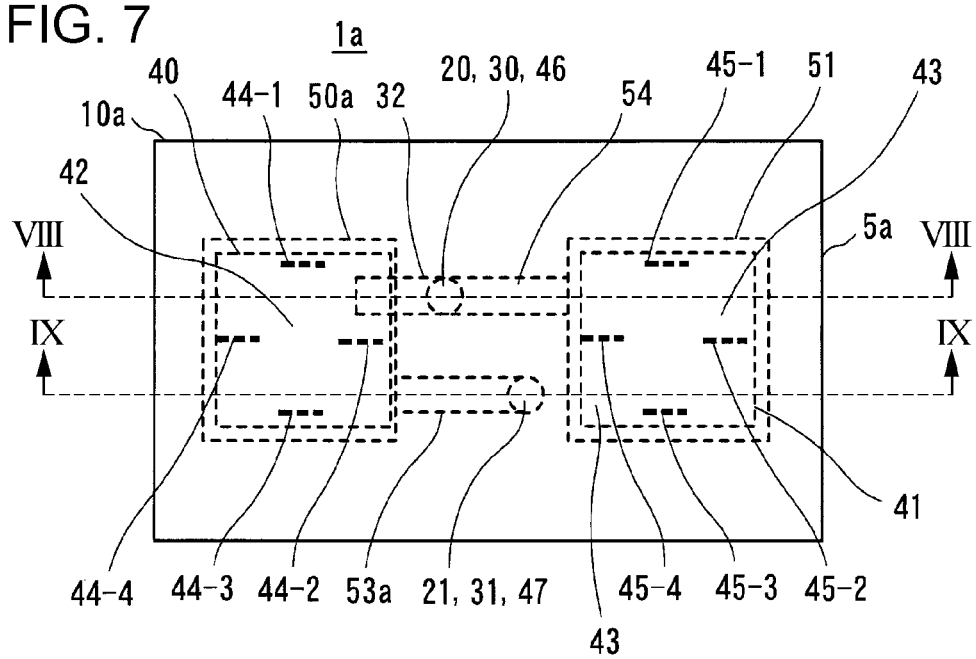
FIG. 7 is a plan view of a sensor element according to a second embodiment of the present disclosure.
Figure 8:
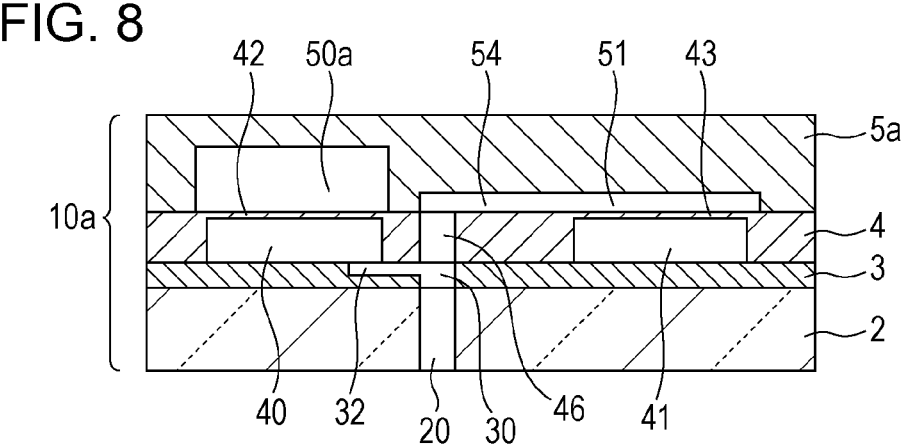
FIG. 8 is a sectional view of the sensor element according to the second embodiment of the present disclosure.
Figure 9:
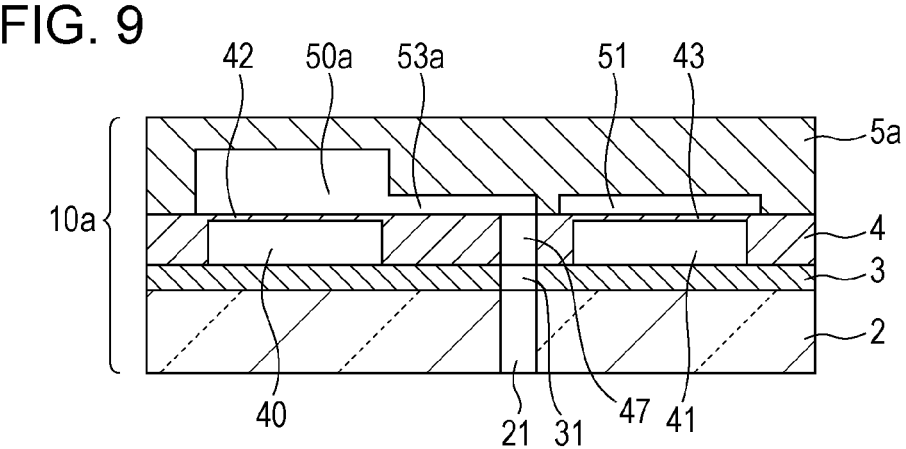
FIG. 9 is a sectional view of the sensor element according to the second embodiment of the present disclosure.

Next, a second embodiment of the present disclosure will be described. FIG. 7 is a plan view of a sensor element according to a second embodiment of the present disclosure. FIG. 8 is a sectional view taken along line VIII-VIII of FIG. 7. FIG. 9 is a sectional view taken along line IX-IX of FIG. 7. A sensor element 1*a* according to the present embodiment includes a diaphragm base and a flat plate-shaped sensor chip 10*a* mounted on the diaphragm base. The diaphragm base is as illustrated in FIG. 6. Thus, description of the diaphragm base is omitted. According to the present embodiment, the amounts of the oils are adjusted with a different adjustment structure from that of the first embodiment.

The sensor chip 10*a* includes the base 2, the channel member 3, the pressure sensitive member 4, and a lid member 5*a*. The base 2 having a flat plate shape is formed of glass. The channel member 3 having a flat plate shape is joined to the base 2 and formed of silicon. The pressure sensitive member 4 having a flat plate shape is joined to the channel member 3 and formed of silicon. The lid member 5*a* having a flat plate shape is joined to the pressure sensitive member 4 and formed of silicon. The base 2, the channel member 3, and the pressure sensitive member 4 are as described for the first embodiment.

The lid member 5*a* has the depression 51 and the groove 54 similarly to the first embodiment. In addition, a square depression 50*a* is formed, in a rear surface of the lid member 5*a* facing the pressure sensitive member 4, at a position where the lid member 5*a* covers the diaphragms 42 when the pressure sensitive member 4 and the lid member 5*a* are joined to each other. The depression 50*a* is formed by removing the rear surface side of the lid member 5*a* such that the front surface side of the lid member 5*a* remains. Also, a groove 53*a* is formed in the rear surface of the lid member 5*a*. The groove 53*a* serves as a pressure introduction path that communicates with the through hole 47 at one end when the pressure sensitive member 4 and the lid member 5*a* are joined to each other and communicates with the depression 50*a* at the other end.

The through holes 21, 31, 47, the groove 53*a*, and the depression 50*a* define the first pressure introduction path through which the first pressure is transmitted to the diaphragm 42. The through holes 20, 30, 46, the groove 32, 54, and the depressions 40, 51 define the second pressure introduction path through which the second pressure is transmitted to the diaphragms 42, 43.

The base 2 and the channel member 3 are joined to each other by direct bonding such that the through holes 20, 21 of the base 2 and the respective through holes 30, 31 of the channel member 3 communicate with each other.

The channel member 3 and the pressure sensitive member 4 are joined to each other by direct bonding such that the through holes 30, 31 of the channel member 3 and the respective through holes 46, 47 of the pressure sensitive member 4 communicate with each other and the groove 32 of the channel member 3 and the depression 40 of the pressure sensitive member 4 communicate with each other.

The pressure sensitive member 4 and the lid member 5*a* are joined to each other by direct bonding such that the depressions 50*a*, 51 of the lid member 5*a* are disposed over the diaphragms 42, 43 of the pressure sensitive member 4, the through hole 46 of the pressure sensitive member 4 and the groove 54 of the lid member 5*a* communicate with each other, and the through hole 47 of the pressure sensitive member 4 and the groove 53*a* of the lid member 5*a* communicate with each other.

The difference between the first embodiment and the present embodiment is that, according to the present embodiment, instead of providing the liquid amount adjustment member 6, the volume of the depression 50*a* is increased compared to the volume of the depression 50, thereby making the amount of the first oil filled in the through holes 21, 31, 47, the groove 53*a*, and the depression 50*a* and the amount of the second oil filled in the through holes 20, 30, 46, the grooves 32, 54, and the depressions 40, 51 to be equal to each other. That is, the depression 50*a* is a liquid amount adjustment chamber (adjustment structure) as well as a pressure introduction chamber.

In this way, the similar effect to that of the first embodiment can be obtained according to the present embodiment.

Third Embodiment

Figure 10:
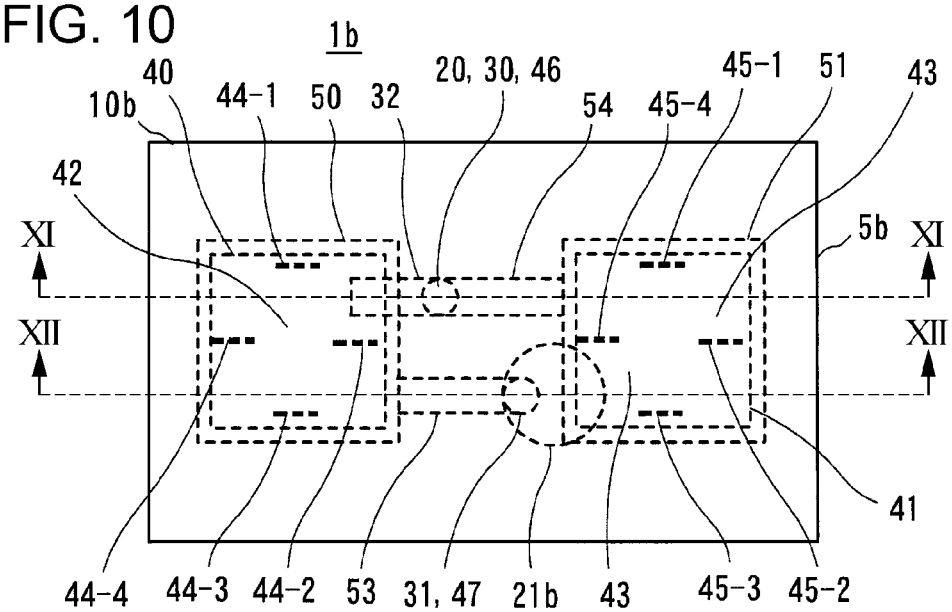
FIG. 10 is a plan view of a sensor element according to a third embodiment of the present disclosure.
Figure 11:
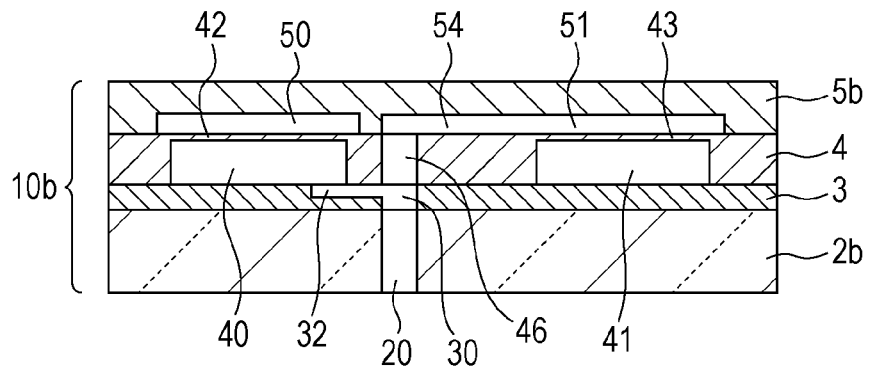
FIG. 11 is a sectional view of the sensor element according to the third embodiment of the present disclosure.
Figure 12:
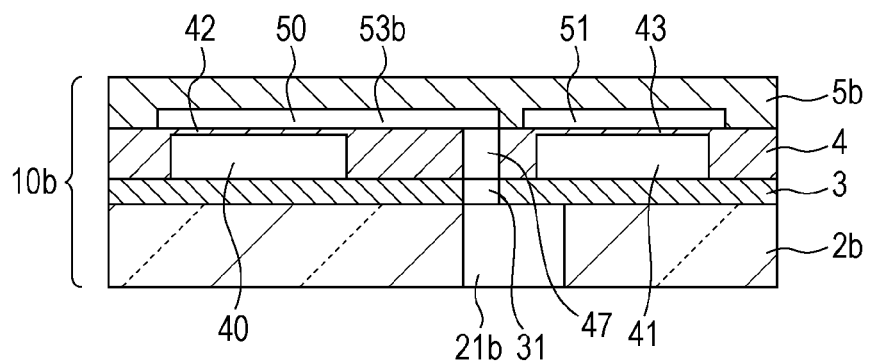
FIG. 12 is a sectional view of the sensor element according to the third embodiment of the present disclosure.

Next, a third embodiment of the present disclosure will be described. FIG. 10 is a plan view of a sensor element according to the third embodiment of the present disclosure. FIG. 11 is a sectional view taken along line XI-XI of FIG. 10. FIG. 12 is a sectional view taken along line XII-XII of FIG. 10. A sensor element 1*b* according to the present embodiment includes a diaphragm base and a flat plate-shaped sensor chip 10*b* mounted on the diaphragm base. The diaphragm base is as illustrated in FIG. 6. Thus, description of the diaphragm base is omitted. According to the present embodiment, the amounts of the oils are adjusted with a different adjustment structure from that of the first and second embodiments.

The sensor chip 10*b* includes a base 2*b*, the channel member 3, the pressure sensitive member 4, and a lid member 5*b*. The base 2*b* having a flat plate shape is formed of glass. The channel member 3 having a flat plate shape is joined to the base 2*b* and formed of silicon. The pressure sensitive member 4 having a flat plate shape is joined to the channel member 3 and formed of silicon. The lid member 5*b* having a flat plate shape is joined to the pressure sensitive member 4 and formed of silicon. The channel member 3 and the pressure sensitive member 4 are as described for the first embodiment.

The base 2*b* has two through holes 20, 21*b* (adjustment structure) that serve as pressure introduction paths penetrating through the base 2*b* from a rear surface to a front surface.

The lid member 5*b* has the depression 50, 51 and the groove 54 similarly to the first embodiment. Also, a groove 53*b* is formed in the rear surface of the lid member 5*b* facing the pressure sensitive member 4. The groove 53*b* serves as a pressure introduction path that communicates with the through hole 47 at one end when the pressure sensitive member 4 and the lid member 5*b* are joined to each other and communicates with the depression 50 at the other end.

The through holes 21*b*, 31, 47, the groove 53*b*, and the depression 50 define the first pressure introduction path through which the first pressure is transmitted to the diaphragm 42. The through holes 20, 30, 46, the groove 32, 54, and the depressions 40, 51 define the second pressure introduction path through which the second pressure is transmitted to the diaphragms 42, 43.

The base 2b and the channel member 3 are joined to each other by direct bonding such that the through holes 20, 21b of the base 2b and the respective through holes 30, 31 of the channel member 3 communicate with each other.

The channel member 3 and the pressure sensitive member 4 are joined to each other by direct bonding such that the through holes 30, 31 of the channel member 3 and the respective through holes 46, 47 of the pressure sensitive member 4 communicate with each other and the groove 32 of the channel member 3 and the depression 40 of the pressure sensitive member 4 communicate with each other.

The pressure sensitive member 4 and the lid member 5b are joined to each other by direct bonding such that the depressions 50, 51 of the lid member 5b are disposed over the diaphragms 42, 43 of the pressure sensitive member 4, the through hole 46 of the pressure sensitive member 4 and the groove 54 of the lid member 5b communicate with each other, and the through hole 47 of the pressure sensitive member 4 and the groove 53b of the lid member 5b communicate with each other.

The difference between the first embodiment and the present embodiment is that, according to the present embodiment, instead of providing the liquid amount adjustment member 6, the diameter of the through hole 21b is increased compared to the diameter of the through hole 20 in the base 2b, thereby making the amount of the first oil filled in the through holes 21b, 31, 47, the groove 53b, and the depression 50 and the amount of the second oil filled in the through holes 20, 30, 46, the grooves 32, 54, and the depressions 40, 51 to be equal to each other.

In this way, the similar effect to that of the first embodiment can be obtained according to the present embodiment.

Fourth Embodiment

Although the adjustment structure for the amounts of the oils is provided in the sensor chips 10, 10a, 10b according to the first to third embodiments, the oil amount adjustment structure may be provided in the diaphragm base on which the sensor chip is mounted.

Figure 13:
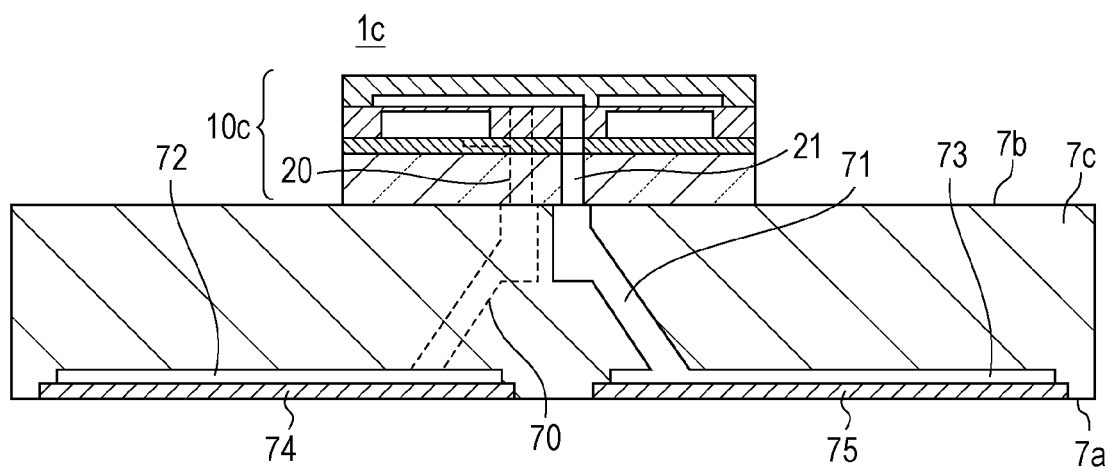
FIG. 13 is a sectional view of a sensor element according to a fourth embodiment of the present disclosure.

FIG. 13 is a sectional view of a sensor element according to a fourth embodiment of the present disclosure. A sensor element 1c according to the present embodiment includes a diaphragm base 7c and the sensor chip 10c mounted on the diaphragm base 7c.

Since the sensor chip 10c has a structure in which the liquid amount adjustment member 6 and the through hole 52 of the lid member 5 are removed from the sensor chip 10 according to the first embodiment (structure illustrated in FIGS. 4 and 5), detailed description of the sensor chip 10c is omitted.

Similarly to the diaphragm base 7, the diaphragm base 7c formed of a metal material has the through holes 70, 71 and the depressions 72, 73. The depression 72 is covered with the barrier diaphragm 74, and the depression 73 is covered with the barrier diaphragm 75.

The sensor chip 10c and the diaphragm base 7c are joined to each other with an adhesive such that the through holes 20, 21 of the sensor chip 10c and the through holes 70, 71 of the diaphragm base 7c respectively communicate with each other.

The depression 73 and the through hole 71 of the diaphragm base 7c define the third pressure introduction path that communicates with the first pressure introduction path so as to allow the first pressure received by the diaphragm 75 to be transmitted to the first pressure introduction path and the diaphragm 42 through the first pressure introduction path. The depression 72 and the through hole 70 of the diaphragm base 7c define a fourth pressure introduction path that communicates with the second pressure introduction path so as to allow the second pressure received by the diaphragm 74 to be transmitted to the second pressure introduction path and the diaphragm 43 through the fourth pressure introduction path.

According to the present embodiment, the diameter of the through hole 71 is increased compared to the diameter of the through hole 70 in the diaphragm base 7c. Thus, the amount of the first oil filled in the depression 73 and the through hole 71 of the diaphragm base 7c and the through holes 21, 31, 47, the groove 53, and the depression 50 of the sensor chip 10c and the amount of the second oil filled in the depression 72 and the through hole 70 of the diaphragm base 7c and the through holes 20, 30, 46, the grooves 32, 54, and the depressions 40, 51 of the sensor chip 10c can be made to be equal to each other.

According to the present embodiment, the similar effect to that of the first embodiment can be obtained by providing the oil amount adjustment structure (through hole 71) not in the sensor chip 10c but in the diaphragm base 7c as described above.

Instead of increasing the diameter of the through hole 71 compared to the diameter of the through hole 70, the volume of the depression 73 (adjustment structure) may be increased compared to the volume of the depression 72 so as to make the amount of the first oil and the amount of the second oil to be equal to each other.

Figure 14:
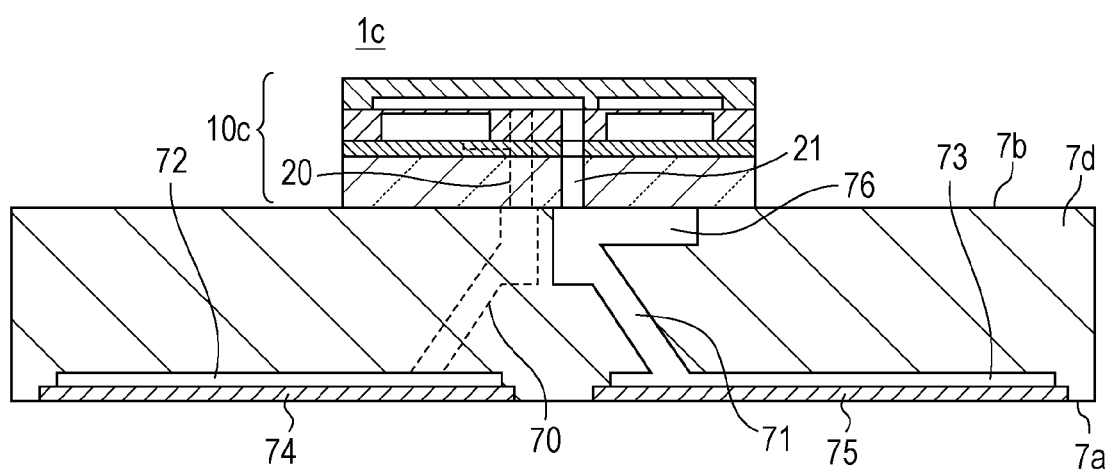
FIG. 14 is a sectional view illustrating another structure of the sensor element according to the fourth embodiment of the present disclosure.

Furthermore, as illustrated in FIG. 14, a liquid amount adjustment chamber 76 (adjustment structure) that communicates with the through hole 71 may be provided in a diaphragm base 7d so as to make the amount of the first oil and the amount of the second oil to be equal to each other.

Fifth Embodiment

Figure 15:
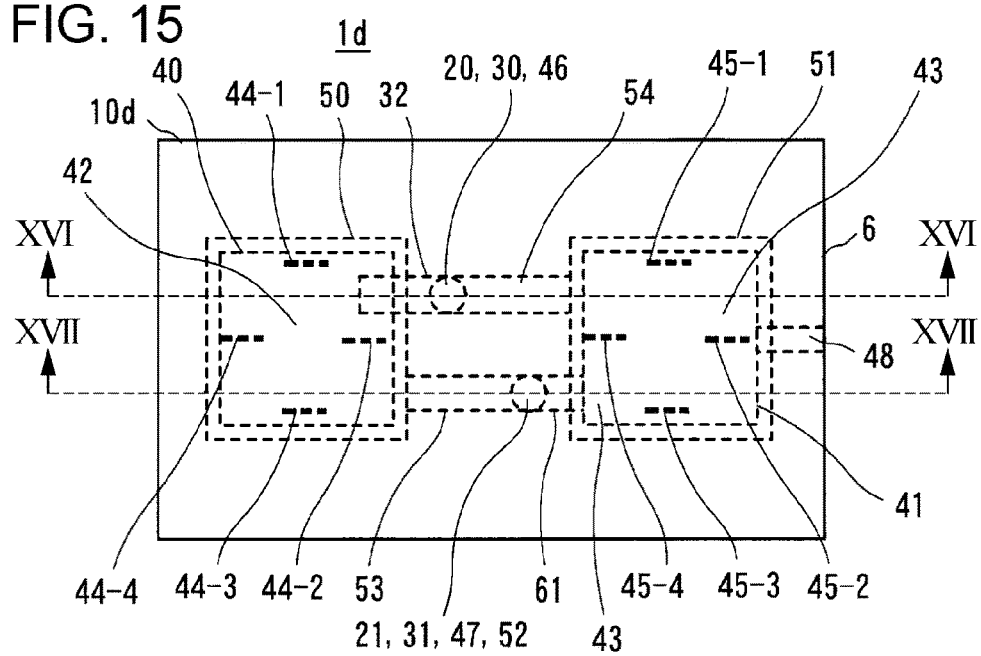
FIG. 15 is a plan view of a sensor element according to a fifth embodiment of the present disclosure.
Figure 16:
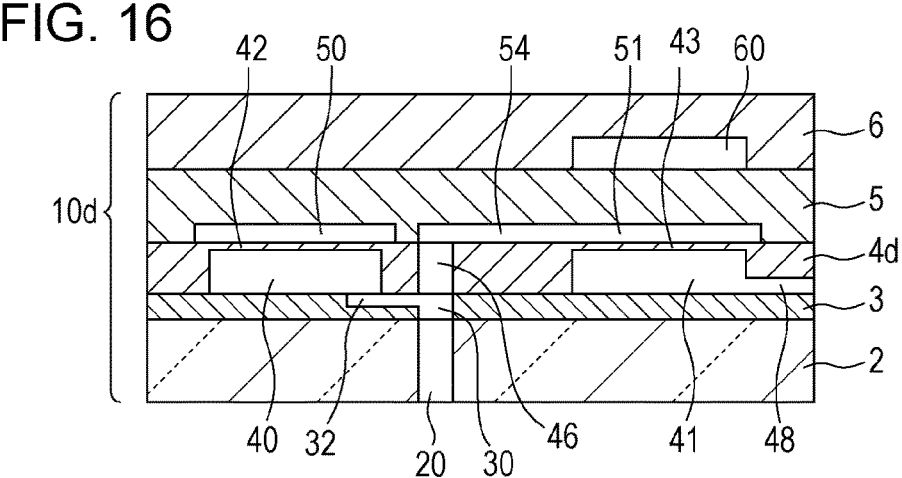
FIG. 16 is a sectional view of the sensor element according to the fifth embodiment of the present disclosure.
Figure 17:
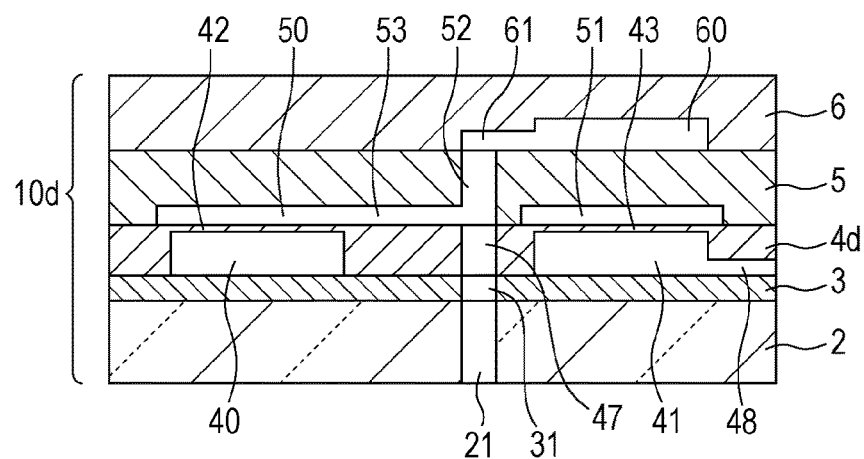
FIG. 17 is a sectional view of the sensor element according to the fifth embodiment of the present.

According to the first to fourth embodiments, the gage pressure of the second pressure can be measured. FIG. 15 is a plan view of a sensor element according to a fifth embodiment of the present disclosure. FIG. 16 is a sectional view taken along line XVI-XVI of FIG. 15. FIG. 17 is a sectional view taken along line XVII-XVII of FIG. 15. A sensor element 1d according to the present embodiment includes a flat plate-shaped sensor chip 10d. The sensor chip 10d includes the base 2, the channel member 3, a pressure sensitive member 4d, the lid member 5, and the liquid amount adjustment member 6. The base 2 having a flat plate shape is formed of glass. The channel member 3 having a flat plate shape is joined to the base 2 and formed of silicon. The pressure sensitive member 4d having a flat plate shape is joined to the channel member 3 and formed of silicon. The lid member 5 having a flat plate shape is joined to the pressure sensitive member 4d and formed of silicon. The liquid amount adjustment member 6 having a flat plate shape is joined to the lid member 5 and formed of silicon. The base 2, the channel member 3, the lid member 5, and the liquid amount adjustment member 6 are as described for the first embodiment.

The pressure sensitive member 4d has a groove 48 in the rear surface of the pressure sensitive member 4 according to the first embodiment. The groove 48 serves as a pressure introduction path that communicates with the depression 41 at one end and opens at a side surface of the pressure sensitive member 4d at the other end. According to the present embodiment, the strain gages 45-1 to 45-4 formed in the diaphragm 43 form, together with the external circuit, a Wheatstone bridge circuit for gage pressure measurement. With the Wheatstone bridge circuit for gage pressure measurement, the gage pressure of the second pressure applied to the upper surface of the diaphragm 43 can be measured. The other elements are as described for the first embodiment.

In this way, the differential pressure and the gage pressure can be simultaneously measured with high accuracy according to the present embodiment. Although the structure for gage pressure measurement is applied to the first embodiment according to the present embodiment, of course, the gage pressure measurement structure may be applied to the second to fourth embodiments.

The embodiments of the present disclosure have been described above in detail with reference to the accompanying drawings. However, the technical scope of the present disclosure is not limited to the above-described examples. It is clear that those skilled in the art in the technical field of the present disclosure can make a variety of modifications without departing from technical ideas described in the claims, and, of course, these modifications are included in the technical scope of the present disclosure.

What is claimed is:

1. A sensor element comprising:
    a sensor chip; and
    a diaphragm base joined to one surface of the sensor chip, wherein
    the sensor chip includes
        a first diaphragm for measuring differential pressure between a first pressure and a second pressure, and
        a second diaphragm for measuring an absolute pressure or gage pressure of the second pressure,
    the sensor chip has a first pressure introduction path through which the first pressure is to be transmitted to the first diaphragm, and a second pressure introduction path through which the second pressure is to be transmitted to the first diaphragm and the second diaphragm,
    the diaphragm base includes
        a third diaphragm configured to directly receive a fluid that is a measurement target having the first pressure, and
        a fourth diaphragm configured to directly receive a fluid that is a measurement target having the second pressure,
    the diaphragm base has a third pressure introduction path that communicates with the first pressure introduction path so as to allow the first pressure received by the third diaphragm to be transmitted to the first pressure introduction path and the first diaphragm through the third pressure introduction path, and a fourth pressure introduction path that communicates with the second pressure introduction path so as to allow the second pressure received by the fourth diaphragm to be transmitted to the second pressure introduction path and the second diaphragm through the fourth pressure introduction path,
    a first pressure transmission medium that is able to transmit the first pressure to the first diaphragm is filled from the first pressure introduction path to the third pressure introduction path,
    a second pressure transmission medium that is able to transmit the second pressure to the first diaphragm and the second diaphragm is filled from the second pressure introduction path to the fourth pressure introduction path, and
    the sensor element has an adjustment structure that is provided partway along a pressure introduction path out of the first pressure introduction path to the third pressure introduction path and that is configured to make an amount of the first pressure transmission medium and an amount of the second pressure transmission medium to be substantially equal to each other.

2. The sensor element according to claim 1, wherein the adjustment structure is a liquid amount adjustment chamber provided partway along the first pressure introduction path so as to make the amount of the first pressure transmission medium and the amount of the second pressure transmission medium to be substantially equal to each other.

3. The sensor element according to claim 1, wherein the adjustment structure is a liquid amount adjustment chamber provided partway along the third pressure introduction path so as to make the amount of the first pressure transmission medium and the amount of the second pressure transmission medium to be substantially equal to each other.

\* \* \* \* \*